Aug. 21, 1951 C. H. HOEPPNER 2,564,692

PULSE GROUP DISCRIMINATOR

Filed Nov. 14, 1945 7 Sheets-Sheet 1

PULSE RECEIVING SYSTEM

Inventor

CONRAD H. HOEPPNER

By Ralph L. Chappell

Attorney

Aug. 21, 1951 C. H. HOEPPNER 2,564,692

PULSE GROUP DISCRIMINATOR

Filed Nov. 14, 1945 7 Sheets-Sheet 2

Inventor
CONRAD H. HOEPPNER

By Ralph L. Chappell
Attorney

Aug. 21, 1951 C. H. HOEPPNER 2,564,692

PULSE GROUP DISCRIMINATOR

Filed Nov. 14, 1945 7 Sheets-Sheet 3

Inventor
CONRAD H. HOEPPNER

By Ralph L. Chappell

Attorney

Inventor
CONRAD H. HOEPPNER

By Ralph L. Chappell
Attorney

Aug. 21, 1951 C. H. HOEPPNER 2,564,692

PULSE GROUP DISCRIMINATOR

Filed Nov. 14, 1945 7 Sheets-Sheet 5

Inventor
CONRAD H. HOEPPNER

By Ralph L. Chappell

Attorney

Aug. 21, 1951 C. H. HOEPPNER 2,564,692

PULSE GROUP DISCRIMINATOR

Filed Nov. 14, 1945 7 Sheets-Sheet 6

Inventor

CONRAD H. HOEPPNER

By Ralph L. Chappell

Attorney

Aug. 21, 1951 C. H. HOEPPNER 2,564,692

PULSE GROUP DISCRIMINATOR

Filed Nov. 14, 1945 7 Sheets-Sheet 7

Inventor

CONRAD H. HOEPPNER

By Ralph L. Chappell

Attorney

Patented Aug. 21, 1951

2,564,692

UNITED STATES PATENT OFFICE 2,564,692

PULSE GROUP DISCRIMINATOR

Conrad H. Hoeppner, Washington, D. C.

Application November 14, 1945, Serial No. 628,638

10 Claims. (Cl. 177—353)

(Granted under the act of March 3, 1883, as amended April 30, 1928; 370 O. G. 757)

This invention relates in general to electronic circuits having discriminatory response characteristics and in particular to an electronic circuit for pulse group structure discrimination.

In radio, radio detection, television, and other electronic fields, it frequently occurs that a number of different potential variations may exist at the input to a component electronic circuit either fortuitously or by intention. If all of such variations are not to be impressed upon the component circuit, it is necessary to provide an intervening circuit with the ability to discriminate between those variations intended for ultimate application to the component circuit and those variations the effect of which would be undesirable. Some characteristic or characteristics of the potential variations must be selected as a basis for pulse discrimination and among such characteristics are time duration, pulse spacing, polarity, rate of change, and amplitude.

Given such a basis and a suitable intervening circuit, many useful applications may result. For example, a means of pulse coding is provided in which intelligence is conveyed by means of electrical impulses endowed with the chosen characteristic in the form in which it will be favored by the receiver of the message. All those electrical impulses not so endowed, whether they be deliberately introduced so as to disguise a communication for secrecy purposes or reach the receiver from man-made or natural sources so as to constitute accidental or deliberate interference, are rejected by the intervening circuit. An obvious extension of such a pulse coding system is to provide a receiver with a plurality of intervening circuits, each so constructed as to select and favor its particular type of electrical impulses. In this way a multiplicity of communication channels may be provided. The endowment of electrical impulses with the chosen characteristic in the form in which they will be favored does not necessarily operate to prevent a variation in another characteristic which can be put to a useful purpose. Thus, pulses which may be restricted as to time duration and spacing so as to be favored by a pulse group discrimination circuit, may also be amplitude modulated so as to convey intelligence or provide a second means of discrimination.

It is an object of this invention to provide a circuit which is responsive only to pulse groups comprising pulses of a predetermined duration predeterminedly spaced in time.

It is another object of this invention to provide a circuit which is responsive only to a predetermined number of electrical impulses of predetermined duration predeterminedly spaced in time.

It is another object of this invention to provide a circuit which is responsive only to a particular pulse group structure and which may not be rendered unresponsive thereto by the prior application of electrical impulses not arranged in that particular pulse group structure.

It is another object of this invention to provide a circuit which may be employed between a source of potential variations or electrical impulses and the receiver thereof as an intervening circuit which shields from such receiver all variations or pulse groups except those having a certain definite group structure.

It is another object of this invention to provide a method of shielding from a signal receiver all electrical impulses not of a predetermined duration predeterminedly time related.

It is another object of this invention to provide a method of producing an output signal in response only to electrical impulses of a predetermined duration predeterminedly time related in such a manner that preceding electrical impulses do not interfere with the production of that output signal.

Other objects and features of this invention will become apparent upon a careful consideration of the following detailed description when taken together with the accompanying drawings in which.

In order to accomplish certain of the objects of this invention, a means of rejecting applied electrical impulses not having predetermined duration characteristics is employed for the dual purpose of repulsing the majority of video signals which may arise from any unrestrained source and of limiting the total number of signals which may be effectively received in a given interval of time. In combination with this means, which may be termed pulse width discriminator means, is employed a sequence of time interval generators each responsive to the output of the pulse width discriminator means. Each member of the sequence of time interval generators except the first is held unresponsive except during the time interval generated by the member immediately preceding it in the sequence. By proper predetermination of the duration of the time intervals generated by the members of the sequence, this combination provides that the last member of the sequence remains unresponsive and fails to generate its time interval unless each precedent member is caused to generate, in turn, its respective time interval and further that a sufficient number of electrical impulses of certain characteristics of duration must be applied to the pulse width discriminator in a given interval to cause the last member of the sequence to generate its time interval. A distinguishing feature of this invention is that, by virtue of the ability to make a proper predetermination of the respective time intervals, the pulse group discriminator remains oblivious to electrical impulses which might otherwise render it unresponsive to a desired pulse group. This feature, which arises from the "limited memory" characteristic of the circuit will be more fully explained in the paragraphs which follow.

Figure 1:
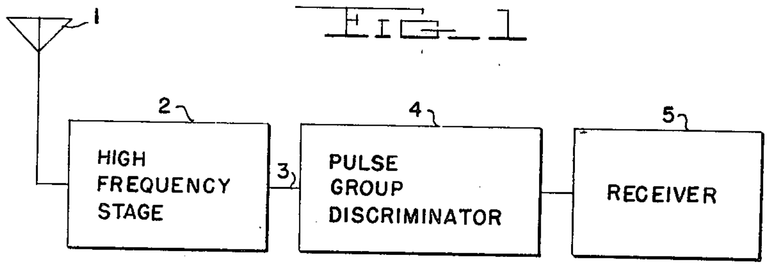
Fig. 1 is a simple block diagram of a pulse receiving system utilizing one embodiment of this invention.

For preliminary explanation, reference is now had to Fig. 1 which is illustrative of a pulse receiving system wherein a pulse group discriminator is employed to repulse undesired video signals. Pulses or bursts of high frequency energy received by antenna 1, amplified and detected by high frequency stage 2 are impressed, in the form of the envelope of the high frequency pulses of energy, to input 3 of pulse group discriminator 4. Since the groups of pulses of high frequency energy reaching antenna 1 may comprise not only a desired signal but also man-made and fortuitous interfering signals of a frequency which high frequency stage 2 will not reject, it is the function of pulse group discriminator 4 to shield from receiver 5 all pulse groups not having the group structure characteristics of the desired signal.

Figure 2:
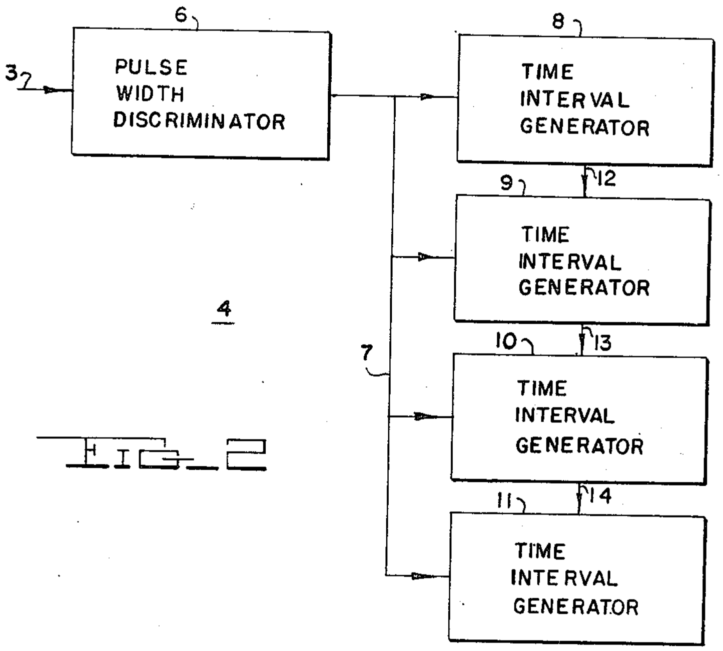
Fig. 2 is a simple block diagram of one embodiment of this invention.

In Fig. 2, pulse group discriminator 4 is shown in block diagram form. Pulse width discriminator 6 represents apparatus which applies a triggering pulse to parallel feeder lead 7 only if an electrical impulse exceeding in duration a predetermined duration is applied at input 3. Blocks 8, 9, 10, and 11 represent a sequence of generators each of which may generate pulses defining time intervals of any desired duration. Connecting the sequence of time intervals generators are connections 12, 13, and 14, which represent the medium by which any given member of the sequence holds the immediately subsequent member of the sequence unresponsive to trigger pulses except during the time interval defined by the pulse generated by that given member.

In operation, pulse width discriminator 6 receives electrical impulses at input 3 and produces a triggering pulse at 7 only in response to each of those electrical impulses which exceed in duration a predetermined duration. Were the time interval defining pulses generated by generators 8, 9, and 10 of infinite duration, any four electrical impulses received by discriminator 6 having the predetermined duration characteristics, regardless of the length (greater than the minimum length) and regardless of the spacing between pulses, would eventually cause generator 11 to produce its pulse. The first triggering pulse at lead 7 would cause generator 8 to function and thereby ready generator 9 to respond to the next trigger pulse. The second triggering pulse (separated from the first by at least the pulse width requirement of discriminator 6) would cause generator 9 to respond and thereby ready generator 10 for the third trigger pulse. This process would continue until the fourth trigger pulse caused generator 11 to function. If, however, the time intervals defined by the pulses produced by generators 8, 9 and 10 are limited, the four electrical impulses which can pass discriminator 6 must all arrive within a predetermined interval of time. That predetermined interval of time is defined by the sums of the maximum spacings which may occur between triggering pulses without the pulse generated by any member of the sequence terminating before the succeeding member of the sequence is caused to generate its time interval. An output signal, may, of course, be taken from the last member of the sequence or from any combination of members of the sequence. In the first case, the output signal will be produced only when four triggering pulses are produced within a predetermined interval of time by discriminator 6. In the second case, an output signal will be produced only when all of the selected combination of members are simultaneously generating their time interval defining pulses. It will be seen that, for generator 11 to be caused to function, the time interval generated by 9 must lap that generated by 8, the time interval generated by 10 must lap that generated by 9, and that the interval generated by 11 will lap that generated by 10. This requirement points up the fact that the triggering pulses must be time related in a predetermined manner and that the character of this manner may be controlled by predetermination of the time intervals generated by the members of the sequence.

Figure 3:
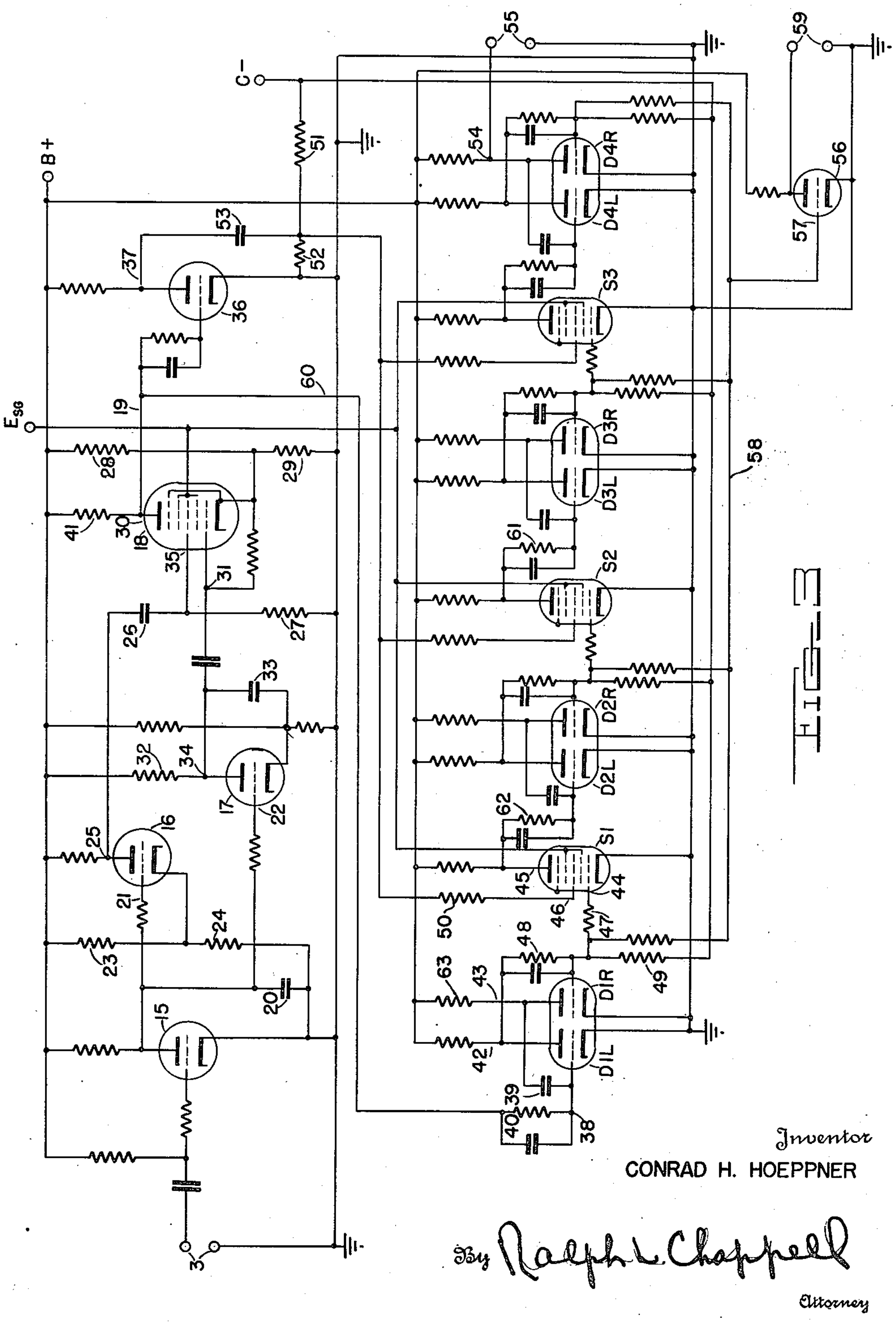
Fig. 3 is a circuit diagram of one of the forms which the embodiment of Fig. 2 may take.

In Fig. 3 is shown a preferred form of circuit for the embodiment of this invention. Vacuum tubes 15, 16, 17 and 18 together with their associated circuit elements comprise a means of producing triggering pulses at lead 19 from each of only those electrical impulses applied at input 3 which possess certain predetermined duration characteristics. There are other circuit arrangements which may be employed to achieve the same purpose but this one has been selected since its operation is described in detail in my copending application, Serial No. 608,804, entitled "Pulse Width Discriminator" filed August 3, 1945, now Patent No. 2,534,264, dated December 19, 1950. Briefly, a negative electrical impulse applied at input 3 drives tube 15 below cutoff and causes capacitor 20 to charge up in a nearly linear manner for the duration of the applied impulse and then to discharge rapidly as tube 15 is again rendered conducting at the end of the impulse. This will be recognized as a conventional sawtooth generator the output of which is applied both to grid 21 of tube 16 and grid 22 of tube 17. The amplitude of the output sawtooth which is applied to tubes 16 and 17 is, of course, a function of the duration of the applied electrical impulse.

Tube 16 is so biased at its cathode by the voltage divider between B+ potential and ground comprising resistors 23 and 24 that the sawtooth must achieve an amplitude corresponding to a predetermined minimum duration of electrical impulse at input 3 before grid 21 is raised high enough in potential to allow tube 16 to conduct. When that minimum duration occurs and that corresponding amplitude is achieved, a rectangular negative pulse appears at plate 25 of tube 16 of a duration determined by the interval of time between the unbiasing of tube 16 and the end of the electrical impulse applied at input 3. This rectangular negative pulse is differentiated by the circuit comprising capacitor 26 and resistor 27 so as to apply a sharp positive pulse to grid 35 of tube 18 at the end of the rectangular negative pulse (and hence at the end of the impulse at input 3). This sharp positive pulse overcomes the bias supplied at the cathode of tube 18 by the voltage divider between B+ and ground comprising resistors 28 and 29 so as to cause tube 18 to conduct and produce a negative triggering pulse at plate 30 for application to lead 19. Tube 17 performs in a manner similar to tube 16 except that its cathode bias is greater and a sawtooth of greater amplitude corresponding to an applied electrical impulse of greater duration is required before tube 17 will conduct. When tube 17 conducts, its plate goes negative and biases off tube 18 at grid 31. Resistor 32, through which capacitor 33 recovers its charge after tube 17 is rendered conducting and then non-conducting, is of such a value that plate 34 of tube 17 rises slowly at the end of an applied electrical impulse at input 3 of a duration great enough to unbias tube 17. Thus, if an impulse of a duration less than that required to unbias tube 16 is applied to input 3, no triggering pulse is produced by tube 18 and applied to lead 19. If an impulse of a duration great enough to unbias tube 16 but too small to unbias tube 17 is applied to input 3, a triggering pulse is produced by tube 18 and applied to lead 19. If, however, tube 17 is unbiased, it holds tube 18 cut off during the short interval when tube 16 would ordinarily render it conducting to produce a triggering pulse. By this means, both "underwidth" and "overwidth" discrimination is accomplished. Tube 36 represents a phase inverter of common arrangement so disposed that the negative triggering pulses appearing on lead 19 become positive triggering pulses when they appear on lead 37 at the output of the phase inverter.

Dual triode tubes D1L and D1R represent the vacuum tube components of a conventional "one-kick" or delay multivibrator which has only one stable state of equilibrium (D1L conducting and D1R non-conducting) but which will maintain, upon receipt of a negative triggering pulse at grid 38 of D1L, a second state (D1R conducting and D1L non-conducting) for a definite interval of time. The time interval for which the second state of the multivibrator can be maintained is determined substantially by the time constant circuit formed by condenser 39, resistor 40, and resistor 41 in the plate circuit of tube 18. As tubes D1L and D1R are driven into non-conduction and conduction respectively to produce the positive pulse at plate circuit 42 of tube D1L which defines the time interval, plate circuit 43 of tube D1R is driven sharply negative and condenser 39, which is fully charged, holds grid 38 of tube D1L below cutoff until it partially discharges through resistors 40 and 41. Within fairly wide limits the duration of the time interval defined by the positive pulse which appears at plate circuit 42 may be varied by variation in the value of resistor 40. It will be seen that dual triode tubes D2L—D2R, D3L—D3R, and D4L—D4R are similar "one-kick" multivibrators each of which may be employed to generate a time interval defining pulse of independently selectable duration.

One of the principles upon which this invention is based is that such a self-returning or "one-kick" multivibrator has only one stable operating state but once triggered, obligingly assumes a second or unstable state for a definite interval of time. At the end of that interval, it insists upon returning to the quiescent stable state originally existing. Thus the multivibrator may be said to have a limited memory in that it remembers only for a definite interval having been triggered at the end of which it promptly forgets the triggering action and is prepared for another limited memory cycle. On the other hand, an electronic switch type of counter, while it is also a member of the multivibrator family, has, in its simplest form, two stable states either of which it will maintain indefinitely if undisturbed. Thus, the electron switch counter, having once been triggered, is unable to forget that action of its own free will. This inability to forget is also characteristic of other electronic counters, such as the condenser type counter, inasmuch as their counting function requires that they remain substantially passive between the applied units being registered.

Another of the principles upon which this invention is based is that if a plurality of self-returning multivibrators be so connected in sequence that each multivibrator, except the first, is unresponsive to triggering pulses except during the second (unstable) state of the immediately preceding multivibrator, the limited memory characteristics of the individual multivibrators may be employed to define an interval of time during which at least one triggering pulse corresponding to each multivibrator must be applied to the sequence in order to cause all the multivibrators to be simultaneously in their second states or to cause the last multivibrator to assume its second state.

Still another principle upon which this invention is based is that if a plurality of self-returning multivibrators be connected as described above, the limited memory characteristic of each of the individual multivibrators may be employed to render ineffective triggering pulses applied to the sequence of multivibrators which do not occur in a specified time relation.

In Fig. 3, tubes S1, S2, and S3 represent a plurality of shielding means electrically disposed between successive members of the sequence of multivibrators D1L—D1R, D2L—D2R, D3L—D3R, and D4L—D4R and between the pulse width discriminator means and a respective member of that sequence excluding D1L—D1R. These shielding tubes operate to hold each multivibrator, except the first, unresponsive to triggering pulses except during the existence of the time interval defining pulse generated by the immediately preceding multivibrator. For example, it will be seen that shielding tube S1 receives its grid 44 signals from D1L—D1R and communicates its plate 45 signals to D2L—D2R and thus connects precedent member D1L—D1R of the sequence to subsequent member D2L—D2R. It will also be seen that triggering pulses produced by the pulse width discriminator at lead 37 of inverter tube 36 are connected through shield tube S1 (via grid 46) to associated subsequent member D2L—D2R of the sequence (via plate circuit 45). Similarly, shielding tubes S2 and S3 connect succeeding members of the multivibrator sequence to each other and to the pulse width discriminator. Grid 44 of tube S1 is returned through resistors 47 and 48 to plate circuit 42 of D1L and through resistors 47 and 49 to C— potential and resistors 47, 48, and 49 have been chosen of such a value that tube S1 may only conduct when D1L is non-conducting to produce the positive time interval defining pulse at plate circuit 42. Grid 46 of tube S1 is returned through resistors 50 and 51 to C— potential and through resistors 50 and 52 to ground in such a manner that tube S1 may only conduct when the pulse width discriminator causes a positive triggering pulse to appear on lead 37 and to be applied to grid 46 through capacitor 53. When the two conditions for the conduction of S1 are established, i. e., D1L—D1R generating its time interval defining pulse and the pulse width discriminator producing a triggering pulse, a negative triggering pulse appears at plate circuit 45 of tube S1 to trigger the associated subsequent member of the sequence, D2L—D2R. Tubes S2 and S3 perform similar functions for their associated precedent and subsequent members of the sequence of multivibrators. If four triggering pulses are produced in the proper time relation by the pulse width discriminator, the members of the sequence generate their time interval defining pulses in succession and a negative pulse of a duration equal to the time interval generated by D4L—D4R is produced by plate circuit 54 of D4R and appears at output terminals 55. This negative pulse at terminals 55 may be communicated to receiver 5 of Fig. 1 and constitute the output signal which indicates the receipt of a pulse group of proper structure at input 3. Likewise an amplitude responsive means such as tube 56 may be connected to selected members of the sequence of multivibrator in such a manner that it responds only when those selected members simultaneously generate their interval defining pulses. In Fig. 3, tube 56 has its grid 57 connected to all members of the sequence through lead 58 and is so chosen that it conducts only when D1L, D2L, D3L and D4L are all non-conducting. This condition occurs only when all members of the sequence are generating their time intervals simultaneously and causes a negative output signal to appear at terminals 59.

Figure 4:
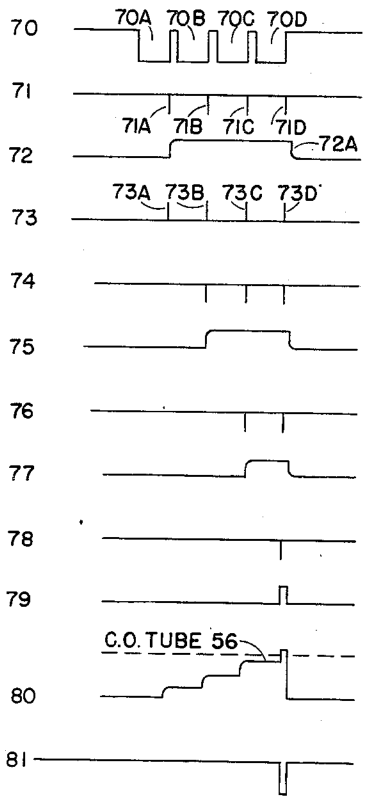
Figs. 4, 5, 6 and 7 represent series of waveforms useful in explaining the operation of the circuit of Fig. 3.

In Fig. 4 are shown several waveforms representative of the voltage variations (with respect to time on the horizontal axis) which occur in the circuit of Fig. 3 when electrical impulses are applied at input terminals 3. These waveforms may be produced under conditions in which the time intervals generated by the members of the sequence are progressively shorter. The interval of D1L—D1R has been adjusted by proper choice of resistance 40 to be just slightly longer than three times the minimum width of an electrical impulse which will cause the pulse width discriminator to produce a triggering pulse. Thus three triggering pulses may be produced if properly time related to the triggering pulse which triggers D1L—D1R during the interval which D1L—D1R generates. Similarly, the interval of D2L—D2R has been adjusted by proper choice of resistor 62 to be just slightly longer than two times the minimum electrical impulse width and the interval of D3L—D3R has been adjusted to be slightly longer than that minimum electrical impulse width. The interval of D4L—D4R has been adjusted to provide an output signal of convenient duration at terminals 55 and 59. Of the waveforms in Fig. 4, waveform 70 represents a series of four negative electrical impulses 70A, 70B, 70C and 70D, each of which just equals the minimum duration required to cause a triggering pulse to appear on lead 19. The four resulting negative triggering pulses, each of which corresponds in time to the trailing edge of a respective pulse group, are represented by waveform 71. Negative pulse 71A is communicated to the first member of the sequence of multivibrators D1L—D1R via lead 60 and causes it to function to generate time interval defining pulse 72A of waveform 72 at plate circuit 42. The remaining pulses 71B, 71C, and 71D of waveform 71 are impotent insofar as D1L—D1R is concerned since D1L is held below cutoff during the interval which the multivibrator generates. The pulses of waveform 71 are also inverted by tube 36 to appear on lead 37 as the series of four positive triggering pulses shown by waveform 73. Pulse 73A raises the second control grids of all the series S shielding tubes above cutoff potential, typified by the raising of grid 46 of tube S1 above cutoff but conduction is prevented by the fact that no member of the sequence is generating its time interval. Pulse 73B again raised the S series second control grids above cutoff and is able to cause S1 to conduct since the first member of the sequence was caused to function by triggering pulse 71A. The culmination of this process is demonstrated by waveform 74 which represents the triggering pulses applied to D2L—D2R, waveform 75 represents the time interval defining pulse generated by D2L—D2R, waveform 76 represents the triggering pulses applied to D3L—D3R, waveform 77 the pulse generated by D3L—D3R, waveform 78 the triggering pulse applied to D4L—D4R, waveform 79 the pulse generated by D4L—D4R, waveform 80 the voltage variations appearing at grid 57 of tube 56, and waveform 81 the output signal at terminals 59. If the output be taken at terminals 55, waveform 80 also represents the expected output signal. It will be seen that had any of the electrical impulses comprising the group applied at input 3 been of too small or too great a duration or had the spacing between any of the pulses been extended, the time relation of the triggering pulses produced would have been such as to allow one or more of the time intervals generated to terminate before a triggering pulse could get through to cause the next time interval to be generated. Thus, an output signal is produced only in response to a predetermined number of triggering pulses produced within a predetermined interval of time. Likewise it will be seen that an output signal is produced only when the time interval generated by D2L—D2R laps that generated by D1L—D1R, the time interval generated by D3L—D3R laps that generated by D2L—D2R, and the time interval generated by D4L—D4R laps that generated by D3L—D3R. In the case of the output signal at terminals 59, it will also be seen that this is produced only when the time intervals generated are coexistent so as to produce waveform 80. As for the output signal at terminals 55, this may be expected whenever D4L—D4R is caused to function. Illustrative of the foregoing are the waveforms of Fig. 5 in which waveform 90 represents a series of electrical impulses applied to input 3. Waveforms 91 through 101 correspond in significance to waveforms 71 through 81 of Fig. 4. In waveform 90, impulses 90A, 90B, 90C, and 90D would produce an output at terminals 55 and 59 except for the fact that the spacing between 90C and 90D is so great that the time interval generated by D3L—D3R, as illustrated by waveform 97, is ended before triggering pulse 91D of waveform 91 can cause D4L—D4R to function. Thus, the bias on tube 56 never is removed sufficiently to allow the grid potential to rise above level "C. O. tube 56" indicated on waveform 100 so as to produce an output pulse at 59. Likewise, D4L—D4R is never caused to function so that no output signal appears at terminals 55. Reverting to waveform 90, it will be seen that impulse 90E is too wide to produce a trigger pulse and that impulse 90F, is too narrow. The remaining pulses are all of the proper duration characteristics, however, and pulses 101J and 101L appear at the outputs. In certain respects the performance is satisfactory since pulses 90A, 90B, 90C, 90D, 90E, 90F, 90G, and 90H all failed to produce an output pulse at either 55 or 59. The mere fact that two output pulses 101J and 101L were produced when the proper impulse group comprising 90I, 90J, 90K and 90L was impressed at input 3 is of slight importance since receiver 5 of Fig. 1 may be so constructed to register only the first of two pulses received so closely spaced. The fact, however, that impulses 90K and 90L could have been missing and there still have been produced at 55 and 59 output pulse 101J is important since this would constitute a condition in which a series of electrical impulses produced an output signal even though no pulse group of the specified structure was present. This trouble may be remedied with respect to output 59 by constructing all but the last multivibrator in the series in such a manner that the rise time of the positive interval defining pulse is slow. For example, had the rise time of pulse 95J of waveform 95 been slow enough, pulse 99J of waveform 99 would have disappeared before waveform 100 reached level C. O. tube 56 as at 100J. In this connection, the distributed capacitance to ground associated with the first control grid circuits, typified by grid 44 of tube S1, of the shielding tubes has been found sufficient to prevent a single triggering pulse from causing two successive members of the multivibrator sequence to function.

Figure 6:
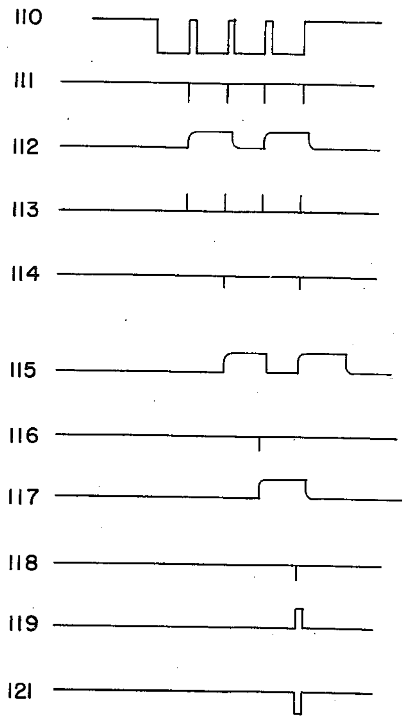

A somewhat different predetermination of the time intervals of the sequence members increases the specificity of the circuit of Fig. 3. This merely involves so choosing resistors 40, 62, and 61 associated with the first three members of the sequence that the interval generated by each is justly slightly more than the minimum pulse width which produces a triggering pulse. Fig. 6 illustrates the response of the circuit so operated to an impulse group identical to that shown by waveform 70 of Fig. 4. As shown by this figure, in which waveforms 110 through 119 have the same significance as waveforms 70 through 79 of Fig. 4, and waveform 121 corresponds to waveform 81, an output pulse is secured at output 55 only when a negative pulse is produced in plate circuit 54 of D4R.

Figure 5:
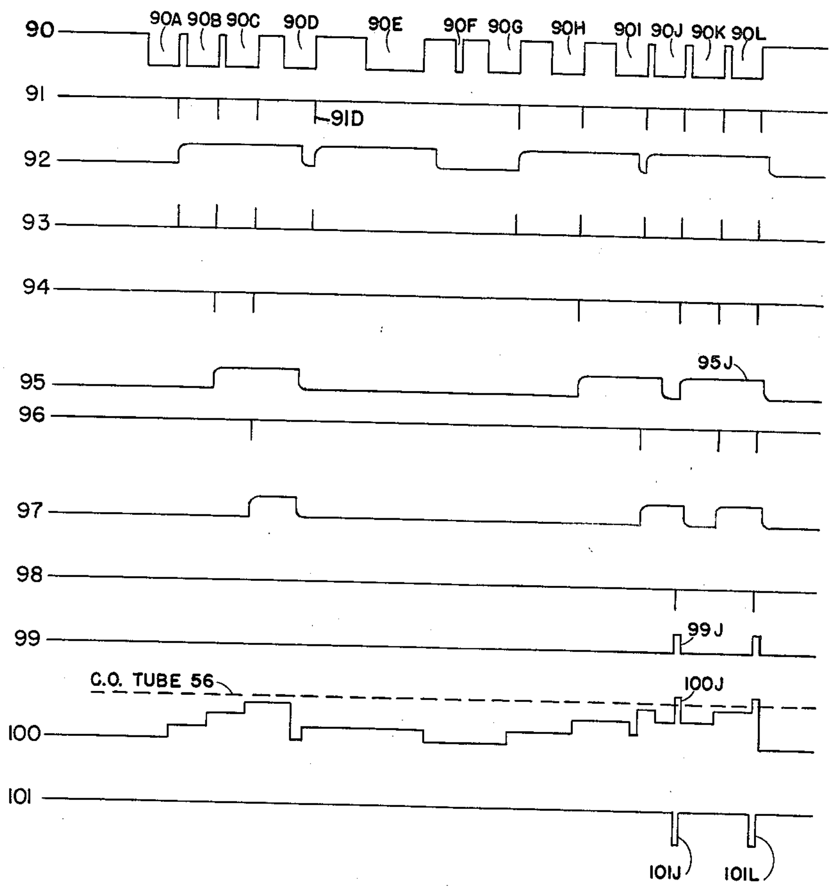
Figure 7:
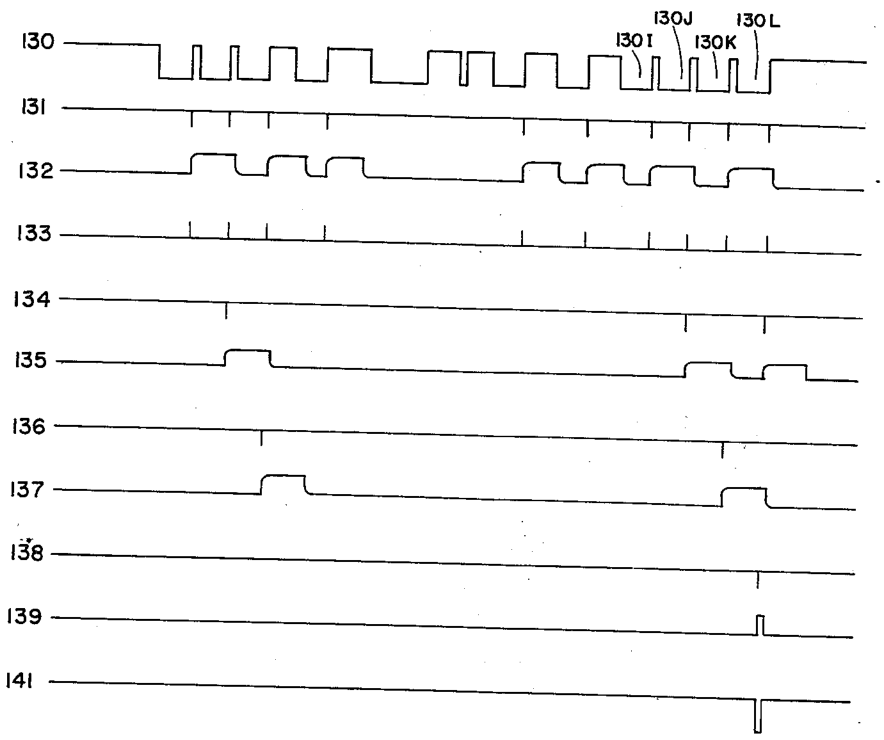

Fig. 7 emphasizes the advantage of this type of operation and shows the response of the circuit to a series of electrical impulses similar to that shown by waveform 90 of Fig. 5. In Fig. 7, waveforms 130 through 141 have the same significance as waveforms 110 through 121 of Fig. 6. By virtue of the fact that no output signal appeared at terminals 55 until the four impulse group comprising 130I, 130J, 130 K and 130 L of waveform 130 was applied to input 3 as shown by waveform 141 is demonstrated by the fact that the pulse group discriminator possesses both high specificity and great reliability. It not only refused to respond to pulse groups not having the predetermined structure but it also remained oblivious to those non-regulation groups when the time came to examine the proper group structure. This last feature is one which distinguishes it from a pulse group discriminator not having the "limited memory" feature. For example, one might construct a discriminator employing a scale-of-four electronic counter automatically reset by a time interval generator. Such a discriminator would operate well to reject non-regulation groups but it is easily duped by one or more impulses preceding a proper impulse group into a condition in which it will fail to respond to that group for which it was intended. The circuit of Fig. 3, when operated as last described, ignores impulses not part of a proper impulse group.

Figure 8:
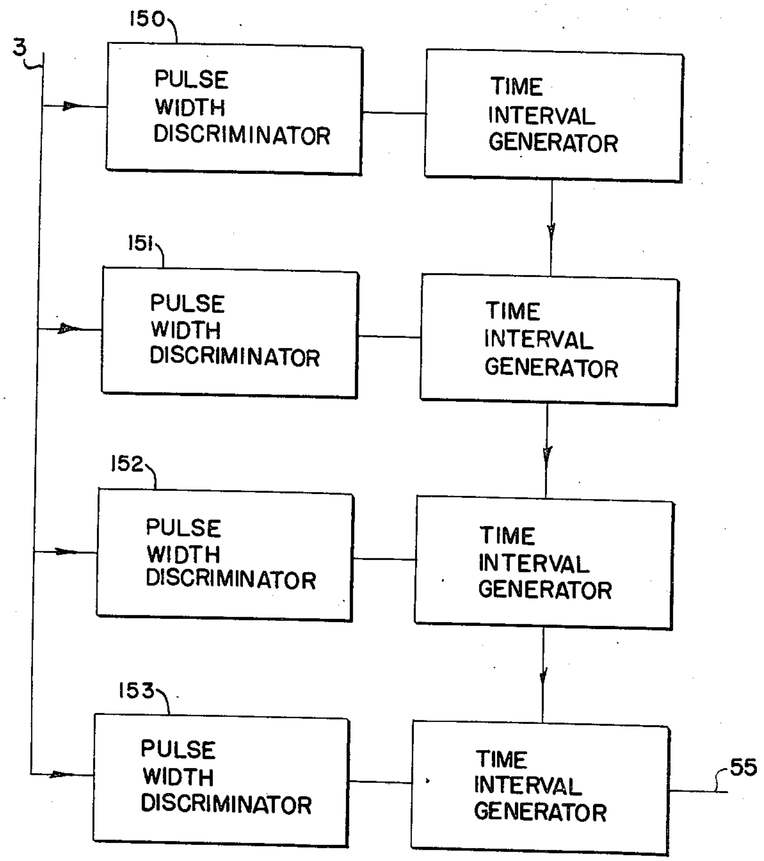
Fig. 8 is a simple block diagram of a variant embodiment of this invention.

To those versed in the art will occur a number of interesting changes in circuitry and operation. For example, the specificity of the circuit may be increased further by providing a plurality of pulse width discriminators rather than one and so connecting them to the multivibrator sequence that each member of the sequence is caused to function in response to an electrical impulse of a different width. There are obviously a considerable number of permutations available and such a construction heightens the secrecy element in a communication system of which a receiving system is shown in Fig. 1. In Fig. 8 is shown in block diagram this variational arrangement. Pulse width discriminators 150, 151, 152, and 153 each have a particular impulse duration to which they respond and if the correct duration impulses in the proper order, all within a predetermined interval of time are not applied to input 3, no output signal appears at terminal 55.

Reverting now to the circuit of Fig. 3, it will be seen that the pulse width discriminator shown having both "underwidth" and "overwidth" characteristics may be replaced by a pulse width discriminator having only the characteristic of "underwidth" discrimination. Any pulse of too great a duration, even though it produced a trigger pulse would find or create a condition in which one of the time intervals would end before a subsequent triggering pulse could be produced.

Other changes include other output connections such as selecting only certain of the members of the sequence for unbiasing an output tube. A mere change in the number of members of the sequence may be made without exceeding the limits of this invention and results only in decreasing or increasing the specificity of the circuit.

It will be apparent that a pulse group discrimination circuit constructed in accordance with the teachings of the invention will have a wide variety of applications in radio, radio detection, television and other electronic fields whenever discrimination between voltage variations is desirable and the time durations of individual variations in a group of pulses and the time relations of these variations can be used as the basis for such discrimination. It will also be apparent that a pulse group discrimination circuit constructed as taught by this invention may be used in combination with other circuits, also discriminatory in response, whose action is based on other characteristics of the input signal such as amplitude; polarity, or rate of change.

Since certain further changes may be made in the foregoing constructions and different embodiments of the inventions may be made without departing from the scope thereof, it is intended that all matter shown in the accompanying drawings or set forth in the accompanying specification shall be interpreted as illustrative and not in a limiting sense.

The invention described herein may be manufactured and used by or for the Government of the United States of America for governmental purposes without the payment of any royalties thereon or therefor.

What is claimed is:

1. A pulse group discriminator comprising, means for producing triggering pulses in response to applied electrical impulses having predetermined duration characteristics, a sequence of pulse generating means for generating impulses of differing fixed durations in response to said triggering pulses, each member, except the first, of said sequence being so constructed as to be unresponsive to said triggering pulses except during the existence of an impulse generated by the member of said sequence immediately preceding, and means for producing an output signal only when the last member of said sequence generates its impulse.

2. A pulse group discriminator comprising, means for producing triggering pulses in response to applied electrical impulses having predetermined duration characteristics, a sequence of pulse generating means for generating impulses of differing fixed durations in response to said triggering pulses, a plurality of shielding means for the selectable application of said triggering pulses to the members of said sequence, said shielding means each disposed between first said means and a respective member, except the first, of said sequence and between two successive members of said sequence, and means for producing an output signal only when the last member of said sequence generates its impulse.

3. A pulse group discriminator comprising, pulse width discriminator means producing triggering pulses from applied electrical impulses, a sequence of multivibrator means each for generating a time interval defining pulse in response to a triggering pulse, a plurality of shielding tubes each connecting two successive members of said sequence, said pulse width discriminator means being connected to the first member of said sequence and, through each of said plurality of shielding tubes, to each of the succeeding members of said sequence, and means producing an output signal only when the last member of said sequence generates its time interval defining pulse.

4. A pulse group discriminator comprising, pulse width discriminator means produciing triggering pulses from applied electrical impulses, a sequence of multivibrator means each for generating a time interval defining pulse in response to a triggering pulse, a plurality of shielding tubes each connecting a precedent member and a subsequent member of said sequence, each of said shielding tubes being so responsive to the pulse generated by its associated precedent member that, only during the time interval defined thereby does said shielding tube permit the application of triggering pulses to its associated subsequent member, said pulse width discriminator means being connected to the first member of said sequence and, through each of said plurality of shielding tubes, to each of the succeeding members of said sequence, and means producing an output signal only when the last member of said sequence generates its time interval defining pulse.

5. A pulse group discriminator comprising, pulse width discriminator means producing triggering pulses from applied electrical impulses, a sequence of multivibrator means each for generating a time interval defining pulse in response to a triggering pulse, a plurality of shielding tubes each connecting a precedent member and a subsequent member of said sequence, each of said shielding tubes being so responsive to the pulse generated by its associated precedent member that, only during the time interval defined thereby does said shielding tube permit the application of triggering pulses to its associated subsequent member, said pulse width discriminator means being connected to the first member of said sequence and, through each of said plurality of shielding tubes, to each of the succeeding members of said sequence, and means producing an output signal only when selected members of said sequence simultaneously generate pulses.

6. A pulse group discriminator comprising, pulse width discriminator means producing triggering pulses from applied electrical impulses, a sequence of multivibrator means each for generating a time interval defining pulse in response to a triggering pulse, a plurality of shielding tubes each connecting a precedent member and a subsequent member of said sequence, each of said shielding tubes being so responsive to the pulse generated by its associated precedent member that, only during the time interval defined thereby does said shielding tube permit the application of triggering pulses to its associated subsequent member, said pulse width discriminator means being connected to the first member of said sequence and, through each of said plurality of shielding tubes, to each of the succeeding members of said sequence, and means producing an output signal only in response to a pulse generated by the last member of said sequence.

7. A pulse group discriminator comprising, a pulse width discriminator means producing triggering pulses from only those of applied electrical impulses which exceed in duration a predetermined duration, a sequence of multivibrator means each for generating a time interval defining pulse in response to a triggering pulse, the interval defined by the pulse generated by each successive member of said sequence being progressively shorter, a plurality of shielding tubes each connecting a precedent member and a subsequent member of said sequence, each of said shielding tubes being so responsive to the pulse generated by its associated precedent member that, only during the time interval defined thereby does said shielding tube permit the application of triggering pulses to its associated subsequent member, a phase inverting means, said pulse width discriminator means being connected to the first member of said sequence and, through said phase inverting means and each of said plurality of shielding tubes, to each of the succeeding members of said sequence, and amplitude responsive means producing an output signal only when selected members of said sequence simultaneously generate pulses.

8. A pulse group discriminator comprising, a pulse width discriminator means producing triggering pulses from only those of applied electrical impulses which exceed in duration a predetermined duration, a sequence of four multivibrator means each for generating a time interval defining pulse in response to a triggering pulse, the pulse generated by the first member of said sequence in response to a triggering pulse having a duration at least equal to the minimum interval required for the production of three subsequent triggering pulses, the pulse generated by the second member of said sequence in response to a triggering pulse having a duration at least equal to the minimum interval required for the production of two subsequent triggering pulses, the pulse generated by the third member of said sequence in response to a triggering pulse having a duration at least equal to the minimum interval required for the production of one subsequent triggering pulse, a plurality of shielding tubes each connecting a precedent member and a subsequent member of said sequence, each of said shielding tubes being so responsive to the pulse generated by its associated precedent member that, only during the time interval defined thereby does said shielding tube permit the application of triggering pulses to its associated subsequent member, a phase inverting means, said pulse width discriminator means being connected to the first member of said sequence and, through said phase inverting means and each of said plurality of shielding tubes, to each of the succeeding members of said sequence, and amplitude responsive means producing an output signal only when selected members of said sequence simultaneously generate pulses.

9. A pulse group discriminator comprising, a pulse width discriminator means producing triggering pulses from only those of applied electrical impulses which exceed in duration a predetermined duration, a sequence of multivibrator means each for generating a time interval defining pulse in response to a triggering pulse, the interval defined by the pulse generated by each successive member of said sequence except the last in response to a triggering pulse having a duration at least equal to the interval required for the production of one subsequent triggering pulse, a plurality of shielding tubes each connecting a precedent member and a subsequent member of said sequence, each of said shielding tubes being so responsive to the pulse generated by its associated precedent member that, only during the time interval defined thereby does said shielding tube permit the application of triggering pulses to its associated subsequent member, a phase inverting means, said pulse width discriminator means being connected to the first member of said sequence and, through said phase inverting means and each of said plurality of shielding tubes, to each of the succeeding members of said sequence, and means producing an output pulse only in response to a pulse generated by the last member of said sequence.

10. A pulse group discriminator comprising, at least one pulse width discriminating means producing triggering pulses from each of only those of applied electrical impulses which possess certain predetermined duration characteristics, a plurality of serially arranged multivibrator means for generating a time interval defining pulse in response to said triggering pulses, a plurality of shielding tubes so interconnecting said series of multivibrator means and said pulse width discriminating means as to prevent the application of triggering pulses to each, except the first, of said series of multivibrator means except during the time interval defined by the pulse generated by the immediately preceding one of said multivibrator means, and means producing an output pulse only when said triggering pulses are so time related as to cause said series of multivibrator means to respond successively.

CONRAD H. HOEPPNER.

REFERENCES CITED

The following references are of record in the file of this patent:

UNITED STATES PATENTS

| Number | Name | Date |
|---|---|---|
| 1,655,689 | Chauveau | Jan. 10, 1928 |
| 1,763,390 | Davis | June 10, 1930 |
| 2,158,285 | Koch | May 16, 1939 |
| 2,255,162 | Hart | Sept. 9, 1941 |
| 2,325,829 | Boswau | Aug. 3, 1943 |
| 2,400,574 | Rea et al. | May 21, 1946 |
| 2,403,561 | Smith | July 9, 1946 |